(12) United States Patent
Park et al.

(10) Patent No.: US 8,599,911 B2
(45) Date of Patent: Dec. 3, 2013

(54) METHOD AND APPARATUS FOR ESTIMATING SIGNAL TO NOISE RATIO IN WIRELESS COMMUNICATION SYSTEM

(75) Inventors: Hyeong Sook Park, Daejeon-si (KR); Jun Woo Kim, Daejeon-si (KR); Youn Ok Park, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 0 days.

(21) Appl. No.: 13/453,450

(22) Filed: Apr. 23, 2012

(65) Prior Publication Data

US 2012/0269251 A1     Oct. 25, 2012

(30) Foreign Application Priority Data

Apr. 22, 2011  (KR) .................. 10-2011-0037608

(51) Int. Cl.
*H04B 3/46* (2006.01)
(52) U.S. Cl.
USPC .......................................................... 375/227
(58) Field of Classification Search
USPC ................................................. 375/227, 224
See application file for complete search history.

(56) References Cited

U.S. PATENT DOCUMENTS

| 6,456,653 | B1 | 9/2002 | Sayeed |
| 2006/0093074 | A1 | 5/2006 | Chang et al. |
| 2007/0147225 | A1* | 6/2007 | Yu et al. ........................ 370/203 |
| 2009/0141786 | A1* | 6/2009 | Park et al. ..................... 375/227 |
| 2011/0151802 | A1* | 6/2011 | Kwak et al. ................ 455/67.13 |

FOREIGN PATENT DOCUMENTS

KR     2006-0062954 A     6/2006

OTHER PUBLICATIONS

Ren GuangLiang et al., "SNR estimation algorithm based on the preamble for OFDM systems", Sci China Ser F-Inf Sci, Jul. 2008, vol. 51, No. 7, pp. 965-974.

* cited by examiner

*Primary Examiner* — Chieh M Fan
*Assistant Examiner* — Brian J Stevens
(74) *Attorney, Agent, or Firm* — Rabin & Berdo, P.C.

(57) ABSTRACT

There is provided a method and apparatus for estimating a signal to noise ratio (SNR) in a wireless communication system. The apparatus selects a preamble signal for each of a plurality of sectors from a reception signal experienced by fast Fourier transform (FFT), outputs a correlation signal by performing a correlation between the preamble signal for each sector and a preamble reference signal, estimates power of the reception signal and noise power for each sector based on the correlation signal, selects a minimum value from among the noise powers for the sectors, outputs a net power for each sector by subtracting the minimum value from the power of the reception signal for each sector, and calculates the SNR by dividing the net power for each sector by the minimum value.

2 Claims, 7 Drawing Sheets

<s=0>

<s=1>

<s=2>

METHOD AND APPARATUS FOR ESTIMATING SIGNAL TO NOISE RATIO IN WIRELESS COMMUNICATION SYSTEM

CROSS-REFERENCE TO RELATED APPLICATIONS

This application claims the benefit of priority of Korean Patent application No. 10-2011-0037608 filed on Apr. 22, 2011, which is incorporated by reference.

BACKGROUND OF THE INVENTION

1. Field of the Invention

The present invention relates to wireless communication and, more particularly, to a method and apparatus for estimating a signal to noise ratio (SNR) in a wireless communication system.

2. Related Art

Effective transmission and reception schemes for broadband wireless communication systems and methods for utilizing the schemes have been proposed in order to maximize the efficiency of limited radio resources. One of systems taken into consideration in the next-generation wireless communication system is an orthogonal frequency division multiplexing (OFDM) system capable of attenuating an inter-symbol interference (ISI) effect with low complexity. In the OFDM system, data symbols received in series are transformed into N parallel data symbols, carried on respective subcarriers, and then transmitted. The subcarriers maintain orthogonality in the frequency dimension. The orthogonal channels experience independent frequency selective fading. Accordingly, ISI can be minimized because complexity in a receiving stage is reduced and spacing between the transmitted symbols is lengthened.

Orthogonal frequency division multiple access (hereinafter referred to as OFDMA) refers to a multiple access method of realizing multi-access by independently providing each user with some of available subcarriers in a system using OFDM as a modulation scheme. In general, in OFDMA, frequency resources called subcarriers are provided to each user, and the frequency resources do not overlap with each other because the frequency resources are independently to a plurality of the users. Accordingly, the frequency resources are exclusively allocated to each user.

A mobile station can estimate the signal to noise ratio (SNR) of a reception signal. The estimated SNR may be applied in various ways. Advanced modulation and coding (AMC) may be applied using the SNR, and a mobile station can stabilize link performance by reporting the SNR to a base station through a message or feedback channel in a multiple-input multiple-output (MIMO) system. Furthermore, system capacity can be improved by using a modulation scheme of a higher order.

Meanwhile, in order to precisely estimate the SNR of a reception signal, it is important to accurately calculate noise power. In general, when the distance between a mobile station and a base station is small, the intensity of the reception signal is strong. An error in the estimation of noise power is increased according to an increase in the intensity of the reception signal. Accordingly, accuracy in estimating the SNR of a reception signal having a high SNR is low.

Accordingly, there is a need for a method of more accurately estimating the SNR.

SUMMARY OF THE INVENTION

The present invention provides a method and apparatus for estimating a signal to noise ratio (SNR) in a wireless communication system. In particular, the present invention provides a method and apparatus for estimating the SNR of a reception signal by using a preamble signal in a 3-sector orthogonal frequency division multiplexing (OFDM) system.

In an aspect, an apparatus for estimating a signal to noise ratio (SNR) is provided. The apparatus includes a preamble selector for each sector configured for selecting a preamble signal for each of a plurality of sectors from a reception signal experienced by fast Fourier transform (FFT), a correlator configured for outputting a correlation signal by performing a correlation between the preamble signal for each sector and a preamble reference signal, a signal power estimator configured for estimating power of the reception signal for each sector based on the correlation signal, noise power estimators each configured for estimating noise power for each sector based on the correlation signal, a minimum value selector configured for selecting a minimum value from among the noise powers for the plurality of sectors, an adder configured for outputting a net power for each sector which is obtained by subtracting the minimum value from the power of the reception signal for each sector, and a divider configured for calculating the SNR by dividing the net power for each sector by the minimum value.

A number of the plurality of sectors may be 3.

The preamble signal for each sector may be allocated every 3 subcarriers in each sector.

The subcarriers to which the preamble signal for each sector is allocated may not overlap with each other in each sector.

In another aspect, an orthogonal frequency division multiplexing (OFDM) receiver in a wireless communication system is provided. The OFDM receiver includes an antenna configured for receiving a signal, a radio frequency (RF) processing unit connected to the antenna and configured for processing the received signal, a guard time removal unit connected to the RF processing unit, a fast Fourier transform (FFT) unit connected to the guard time removal unit, an equalizer connected to the FFT unit, and the apparatus for estimating a signal to noise ratio (SNR) connected to the FFT unit.

In another aspect, a method for estimating a signal to noise ratio (SNR) in a wireless communication system is provided. The method includes selecting a preamble signal for each of a plurality of sectors from a reception signal experienced by fast Fourier transform (FFT), performing a correlation between the preamble signal for each sector and a preamble reference signal, estimating power of the reception signal for each sector based on the correlation signal, estimating noise power for each sector based on the correlation signal, selecting a minimum value from among the noise powers for the plurality of sectors, outputting a net power for each sector which is obtained by subtracting the minimum value from the power of the reception signal for each sector, and calculating the SNR by dividing the net power for each sector by the minimum value.

DESCRIPTION OF EXEMPLARY EMBODIMENTS

Hereinafter, some embodiments of the present invention are described in detail with reference to the accompanying drawings in order for those skilled in the art to be able to readily implement the invention. However, the present invention may be modified in various different forms and are not limited to the following embodiments. In order to clarify a description of the present invention, parts not related to the description are omitted, and the same reference numbers are used throughout the drawings to refer to the same or like parts. Furthermore, a description of parts which may be easily understood by those skilled in the art is omitted.

In the entire specification and claims, when it is said that any element "includes (or comprises)" any element, it means the corresponding element does not exclude other elements other than the corresponding element and may further include other elements which fall within the scope of the technical spirit of the present invention.

The following technologies may be used in a variety of multiple access schemes, such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented using radio technology, such as universal terrestrial radio access (UTRA) or CDMA2000. TDMA may be implemented using radio technology, such as global system for mobile communications (GSM)/general packet radio service (GPRS)/enhanced data Rates for GSM evolution (EDGE). OFDMA may be implemented using radio technology, such as institute of electrical and electronics engineers (IEEE) 802.11 (Wi-Fi), IEEE 802.16 (WiMAX), IEEE 802.20, or evolved UTRA (E-UTRA). IEEE 802.16m is an evolution of IEEE 802.16e, and it provides backward compatibility with systems based on IEEE 802.16e. UTRA is part of a universal mobile telecommunications system (UMTS). $3^{rd}$ generation partnership project (3GPP) long term evolution (LTE) is part of an evolved UMTS (E-UMTS) using E-UTRA, and it adopts OFDMA in downlink and adopts SC-FDMA in uplink. LTE-advanced (LTE-A) is an evolution of LTE.

IEEE 802.16e is chiefly described in order to clarify a description, but the technical spirit of the present invention is not limited thereto.

Figure 1:
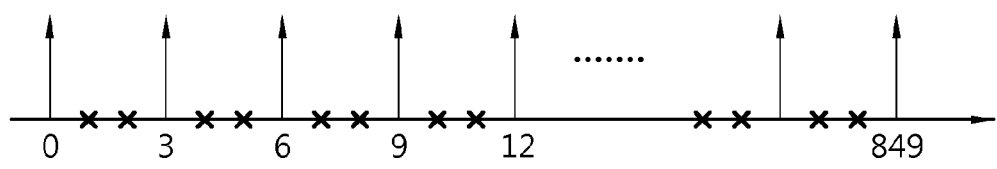
FIG. 1 shows an example of a preamble structure of an IEEE 802.16e system.
Figure 1:
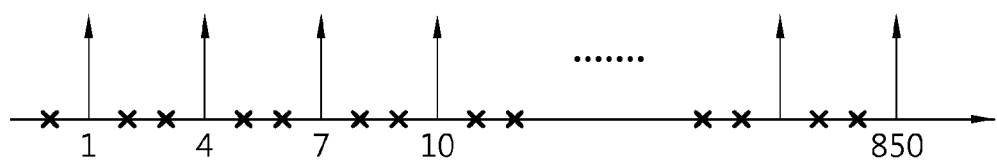
Figure 1:
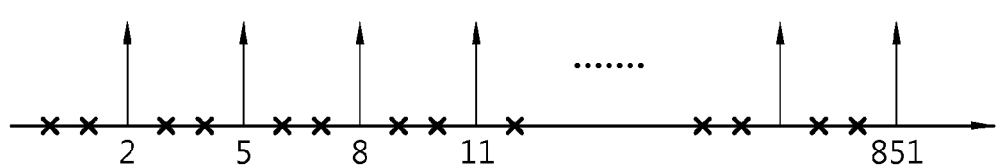

FIG. 1 shows an example of a preamble structure of an IEEE 802.16e system.

A first symbol for downlink transmission may be used to transmit a preamble signal. 3 different preamble carrier sets having different subcarrier allocations according to each fast Fourier transform (FFT) size may be defined. The subcarriers may be modulated in accordance with a binary phase shift keying (BPSK) modulation scheme boosted by specific pseudo-noise (PN) codes.

Referring to FIG. 1, the frequency domain within one cell is classified into three sectors s0 to s2. In the sector 0 (s=0), the preamble signal is transmitted in a preamble carrier set 0 including subcarrier indices 0, 3, 6, . . . . In the sector 1 (s=1), the preamble signal is transmitted in a preamble carrier set 1 including subcarrier indices 1, 4, 7, . . . . In the sector 2 (s=2), the preamble signal is transmitted in a preamble carrier set 2 including subcarrier indices 2, 5, 8, . . . . Since the frequency domain is classified into the three sectors and different subcarriers are allocated to the sectors as described above, noise power may be calculated for every sector.

Figure 2:
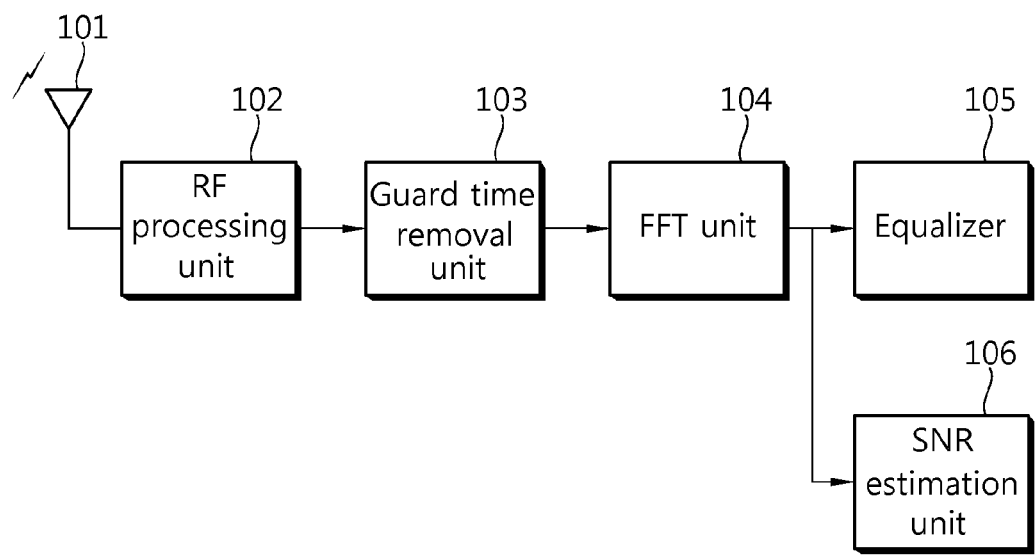
FIG. 2 is a block diagram showing a common OFDM receiver in an OFDMA system.

FIG. 2 is a block diagram showing a common OFDM receiver in an OFDMA system.

The OFDM receiver includes an antenna 101, a radio frequency (RF) processing unit 102, a guard time removal unit 103, an FFT unit 104, an equalizer 105, and a signal to noise ratio (SNR) estimation unit 106. Reception signals received through the antenna 101 experience the RF processing unit 102 and the guard time removal unit 103. The SNR estimation unit 106 selects a preamble signal from the reception signal outputted from the FFT unit 104 and estimates an SNR of the preamble signal. That is, when an OFDM transmitter sends a signal having a known pattern, called a preamble signal, an OFDM receiver estimate an SNR using the preamble signal. Here, the preamble structure of IEEE 802.16e shown in FIG. 1 may be used. In the preamble structure of FIG. 1, a code string is allocated to the preamble signal every 3 subcarriers per sector in the frequency domain.

Figure 3:
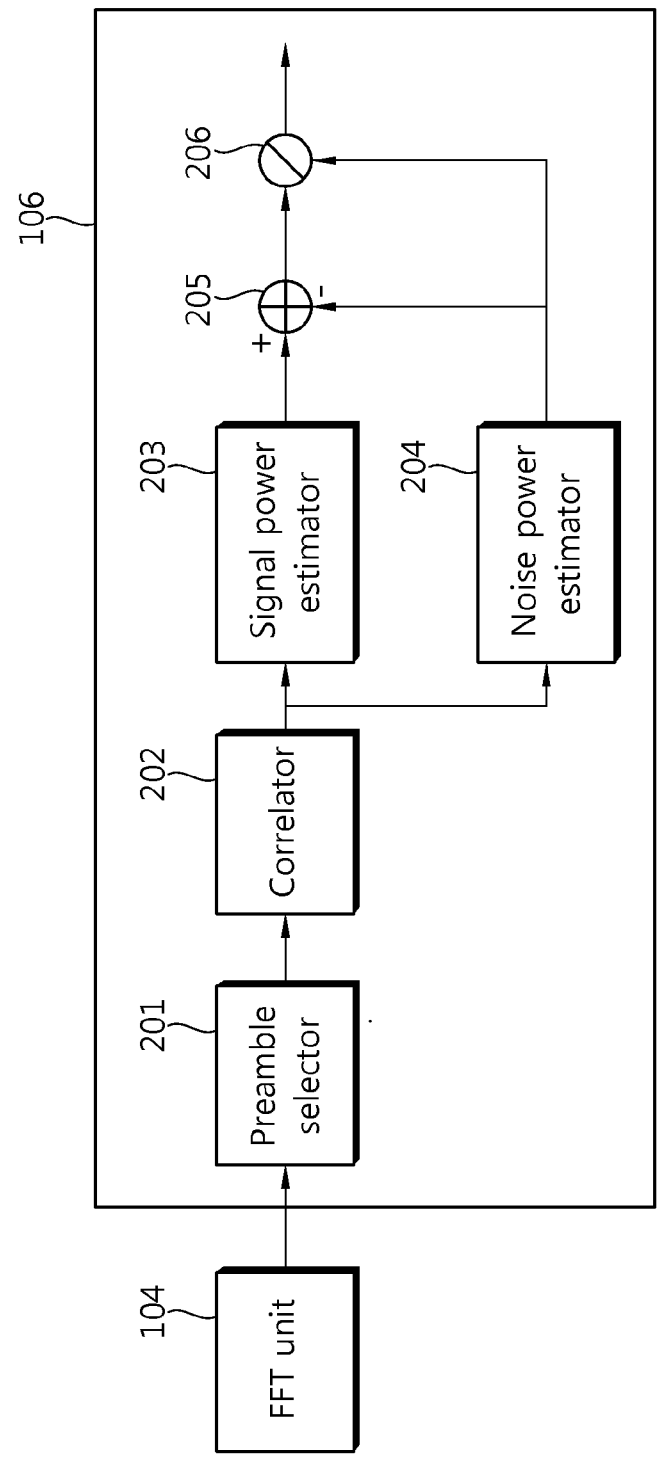
FIG. 3 is a block diagram showing the SNR estimation unit of the OFDM receiver.

FIG. 3 is a block diagram showing the SNR estimation unit of the OFDM receiver.

Referring to FIG. 3, the SNR estimation unit 106 includes a preamble selector 201, a correlator 202, a signal power estimator 203, a noise power estimator 204, an adder 205, and a divider 206. A correlation between a preamble signal selected by the preamble selector 201 via the FFT unit 104 and a reference signal of the preamble signal generated by a reception unit is performed by the correlator 202. The correlator 202 outputs a correlation signal. The signal power estimator 203 estimates signal power based on the correlation signal, and the noise power estimator 204 estimates noise power based on the correlation signal. The divider 206 calculates an SNR by dividing the estimated signal power by the estimated noise power. Here, the signal power is the remainder obtained by subtracting the noise power from the total power of the reception signal. This may be performed by the adder 205.

In order to accurately calculate the SNR of the reception signal, it is important to precisely calculate the noise power. The present invention proposes a method of more accurately estimating an SNR by taking a minimum value of noise power, calculated per sector, as noise power of the relevant sector in a system in which different subcarriers are allocated to sectors in order to reduce inter-cell interference.

Figure 4:
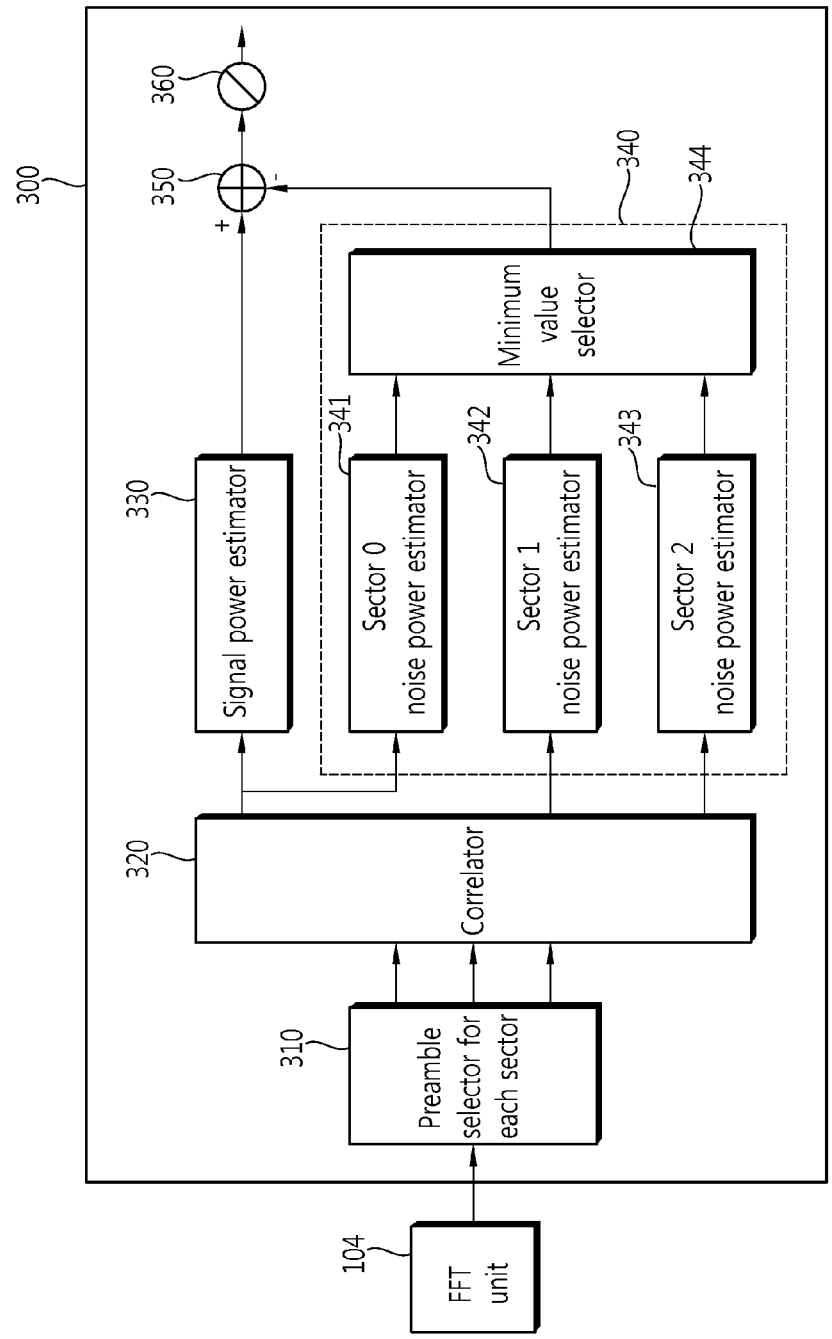
FIG. 4 is a block diagram showing an SNR estimation unit of the OFDM receiver according to a proposed SNR estimation method.

FIG. 4 is a block diagram showing an SNR estimation unit of the OFDM receiver according to a proposed SNR estimation method.

Referring to FIG. 4, the SNR estimation unit 300 includes a preamble selector for each sector 310, a correlator 320, a signal power estimator 330, a sector 0 noise power estimator 341, a sector 1 noise power estimator 342, a sector 2 noise power estimator 343, a minimum value selector 344, an adder 350, and a divider 360. The preamble selector for each sector 310 selects a preamble signal for each sector from a reception signal outputted from the FFT unit 104. The correlator 320 outputs a correlation signal by performing a correlation between the preamble signal selected for every sector and a reference signal of the preamble signal generated by a reception unit. The signal power estimator 330 estimates signal power based on the correlation signal. The sector 0 noise power estimator 341, the sector 1 noise power estimator 342, and the sector 2 noise power estimator 343 estimate respective noise powers of the sector 0, the sector 1, and the sector 2 based on the correlation signal. The minimum value selector 344 selects a minimum value from among the noise powers of the sectors 0, 1, and 2 respectively estimated by the sector 0 noise power estimator 341, the sector 1 noise power estimator 342, and the sector 2 noise power estimator 343. The divider 360 calculates the SNR by dividing the estimated signal power by the minimum value of the noise power for each sector. Here, the signal power is the remainder obtained by subtracting the minimum value of the noise power for each sector for the total power of the reception signal. This may be performed by the adder 350.

The operation of the SNR estimation unit 300 is described below based on equations.

Assuming accurate synchronization in a receiver, the FFT output $Y_m^{(n)}$ of an $m^{th}$ subcarrier in an $n^{th}$ OFDM symbol may be represented by Equation 1.

$$Y_m^{(n)} = H_m^{(n)} X_m^{(n)} + N_m^{(n)}, \quad m = 0, 1, \ldots, N_{used} - 1 \quad \text{[Equation 1]}$$

In Equation 1, $X_m^{(n)}$ is the transmission signal of the $m^{th}$ subcarrier in the $n^{th}$ OFDM symbol, and $N_m^{(n)}$ is additive white Gaussian noise (AWGN) having an average of 0 and a standard deviation of $\sigma^2$. $H_m^{(n)}$ is the channel response of the $m^{th}$ subcarrier in the $n^{th}$ OFDM symbol. $N_{used}$ is the number of subcarriers that may be used in the frequency domain. A code string is allocated to a preamble signal every 3 subcarriers, and thus the subcarrier index m in Equation 1 may be defined as in Equation 2.

$$M = 3k + s \quad \text{[Equation 2]}$$

$s = 0, 1, 2, k = 0, 1, \ldots, K-1, m = 0, 1, \ldots, N_{used} - 1$

In Equation 2, k is a preamble symbol index, and s is a sector index.

$$K = \left\lfloor \frac{N_{used}}{3} \right\rfloor.$$

Accordingly, the FFT output of each sector may be represented by Equation 3.

$$Y_m^{(n)} = Y_{k,s}^{(n)} = H_{k,s}^{(n)} X_{k,s}^{(n)} + N_{k,s}^{(n)} \quad \text{[Equation 3]}$$

$s = 0, 1, 2,$
$k = 0, 1, \ldots, K-1, m = 0, 1, \ldots N_{used} - 1$

Meanwhile, the noise power of each sector may be calculated based on $F_{k,s}$ defined by Equation 4, assuming that contiguous subcarriers have the same channel characteristic ($H_k \approx H_{k-1} \approx H_{k+1}$).

$$F_{0,s} = X_{0,s} * Y_{0,s} - X_{1,s} * Y_{1,s}$$

$$F_{k,s} = 2 X_{k,s} * Y_{k,s} - X_{k-1,s} * Y_{k-1,s} - X_{k+1,s} * Y_{k+1,s}, \quad k = 1, 2, \ldots K-2$$

$$F_{K-1,s} = X_{K-1,s} * Y_{K-1,s} - X_{K-2,s} * Y_{K-2,s} \quad \text{[Equation 4]}$$

If the frequency domain is classified into three sectors, a mobile station receives all the signals from the three sectors. The received signals are classified for every sector as in Equation 5.

$$Y_{k,0} = H_{k,0} X_{k,0} + N_{k,0},$$

$$Y_{k,1} = H_{k,1} X_{k,1} + N_{k,1},$$

$$Y_{k,2} = H_{k,2} X_{k,2} + N_{k,2}, \quad k = 0, 1, \ldots, K-1 \quad \text{[Equation 5]}$$

In Equation 5, $H_{k,0}$, $H_{k,1}$, and $H_{k,2}$ indicate independent channel characteristics of the three sectors, and $X_{k,0}$, $X_{k,1}$ and $X_{k,2}$ indicate the signals transmitted from the sectors when an OFDM symbol index n=0. Equation 5 and a code string for each sector are subject to a correlation, and noise power for each sector may be calculated using Equation 6.

$$\hat{\sigma}_{EB,s}^2 = \frac{1}{K} \left( \frac{|F_{0,s}|^2}{2} + \frac{|F_{K-1,s}|^2}{2} + \sum_{k=1}^{K-2} \frac{|F_{k,s}|^2}{6} \right), \quad \text{[Equation 6]}$$

$s = 0, 1, 2$

Meanwhile, $F_{k,s}$ is influenced by reception power of a signal. This may be represented as in Equation 7.

$$F_{k,s} = f(P_s) + \hat{N}_k \quad \text{[Equation 7]}$$

According to Equation 6 and Equation 7, $\hat{\sigma}_{EB,s}^2$ increases as $f(P_s)$ increases. Accordingly, a minimum value of the noise power for each sector, selected by Equation 8, may be used as the noise power.

$$\hat{\sigma}_P^2 = \min_s \hat{\sigma}_{EB,s}^2 \quad \text{[Equation 8]}$$

An SNR of each sector may be calculated by using the minimum value of the noise power for each sector. In one OFDM symbol disregarding the OFDM symbol index n, the SNR of each sector may be calculated according to Equation 9.

$$S\hat{N}R_s = \frac{\hat{P}_s}{\hat{\sigma}_s^2} = \frac{\frac{1}{K} \sum_{k=0}^{K-1} |Y_{k,s}^{(n)}|^2 - \hat{\sigma}_s^2}{\hat{\sigma}_s^2} \quad \text{[Equation 9]}$$

In Equation 9, $\hat{P}_s$ indicates the signal power of a relevant sector. The signal power of the relevant sector is a value obtained by subtracting the minimum value of the noise power for each sector from the total power of the reception signal.

The performance of the proposed SNR estimation method is described below. Simulation conditions are given as in Table 1.

TABLE 1

| Parameter | Value |
| --- | --- |
| Channel BW | 10 MHz |
| Frame length | 5 ms |
| FFT size $N_{FFT}$ | 1024 |
| Preamble $N_{used}$ | 852 |
| OFDMA symbol time | 102.9 μs |
| Subcarrier spacing | 10.94 KHz |
| Sampling frequency | 11.2 MHz |
| Preamble power boosting | 9 dB |

Figure 5:
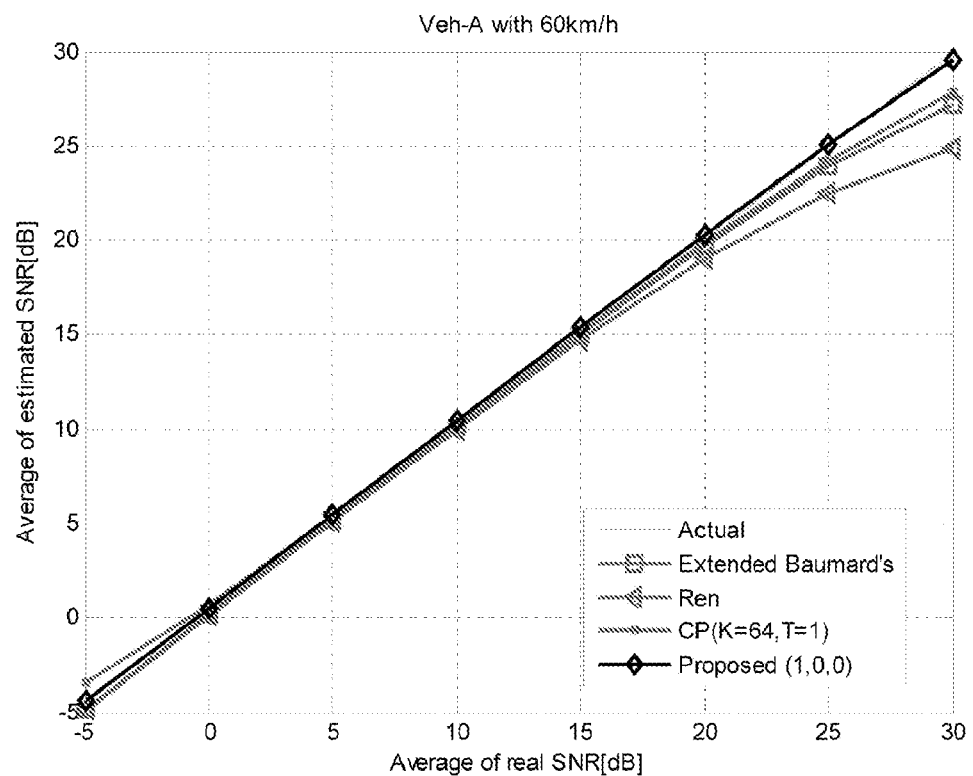
FIGS. 5 to 7 are graphs showing the performance of the proposed SNR estimation method.
Figure 6:
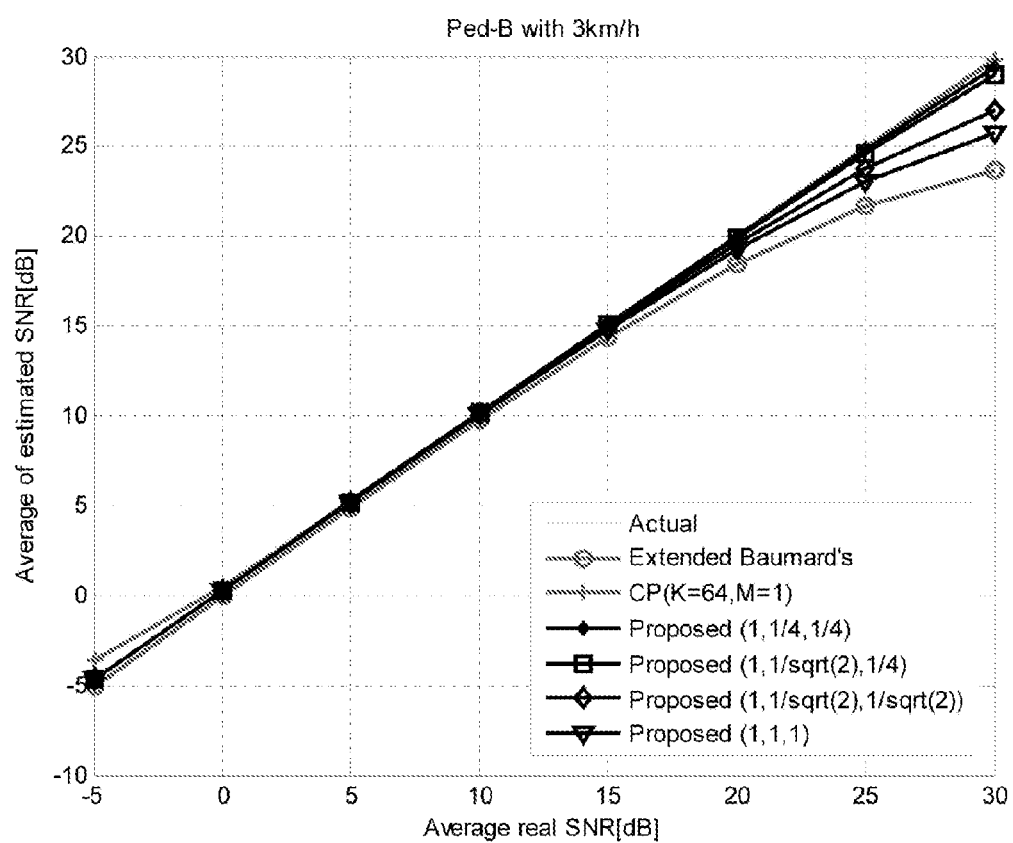
Figure 7:
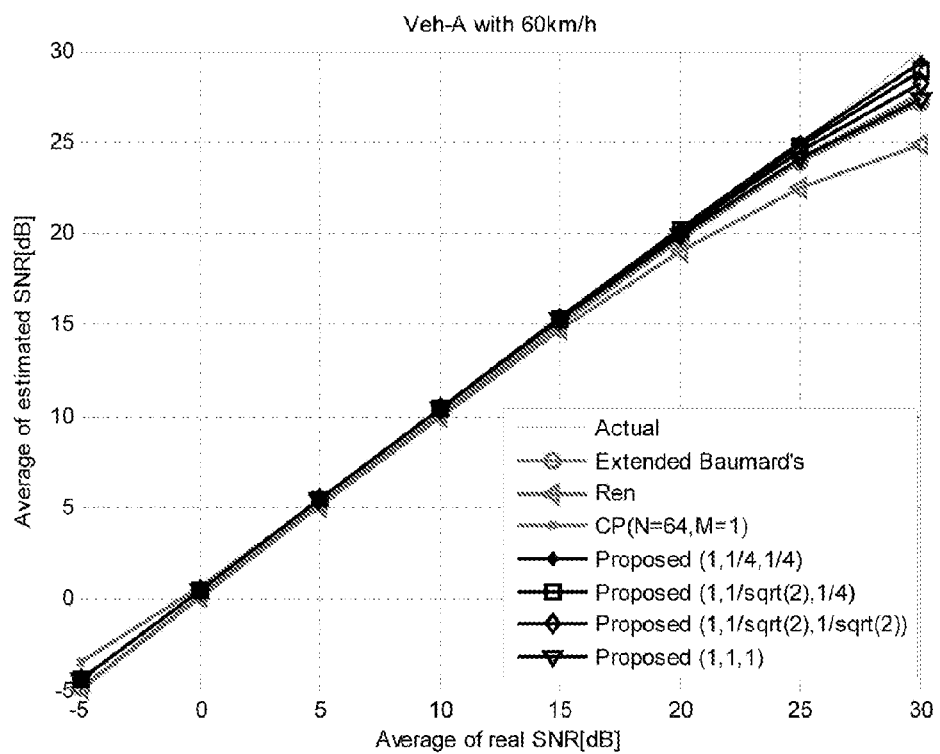

FIGS. 5 to 7 are graphs showing the performance of the proposed SNR estimation method.

In FIGS. 5 to 7, the power ratios of the three sectors are $P_0$, $P_1$, and $P_2$. $P_i$ is the signal received from the sector and a function of the distance up to a mobile station. From FIG. 5, it can be seen that an SNR estimated using the proposed SNR estimation method is more accurate than an SNR estimated using the prior art although the SNR estimated using the proposed SNR estimation method is greater than a real SNR, when an SNR within a vehicle moving at 60 km/h is estimated. In particular, assuming that a relevant sector is the sector 0, a real SNR can be accurately estimated in case of ($P_0$, $P_1$, $P_2$) = (1,0,0). This is because noise power can be accurately calculated because only noise is loaded onto the subcarriers of other sectors. FIG. 6 shows SNR estimation performance in case of a walker moving at 3 km/h, and FIG. 7 shows SNR estimation performance in case of a vehicle moving at 60 km/h. When a real Signal to Noise Ratio (SNR) is high, SNR estimation performance can be increased.

The present invention can increase a SNR estimation performance when a real SNR is high.

The present invention may be implemented using hardware, software, or a combination of them. In hardware implementations, the present invention may be implemented using application specific integrated circuits (ASICs), digital signal processors (DSPs), programmable logic devices (PLDs), field programmable gate arrays (FPGAs), processors, controllers, microprocessors, other electronic units, or a combination of them, which are designed to perform the above function. In software implementations, the present invention may be implemented using a module performing the above function. The software may be stored in the memory and executed by the processor. The memory or the processor may adopt various means well known to those skilled in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above embodiments include various aspects of examples. Although all the possible combinations for describing the various aspects may not be described, those skilled in the art may appreciate that other combinations are possible. Accordingly, the present invention should be construed as including all other replacements, modifications, and changes which fall within the scope of the claims.

What is claimed is:

1. An apparatus for estimating a signal to noise ratio (SNR), the apparatus comprising:
   a signal power estimator configured for estimating power of a reception signal for each sector;
   noise power estimators each configured for estimating noise power for each sector;
   a minimum value selector configured for selecting a minimum value from among the noise powers for a plurality of sectors; and
   an SNR calculator configured for calculating the SNR based on the power of the reception signal for each sector and the minimum value,
   wherein the noise power for each sector is calculated using the equation below:

$$\hat{\sigma}_{EB,s}^2 = \frac{1}{K}\left(\frac{|F_{0,s}|^2}{2} + \frac{|F_{K-1,s}|^2}{2} + \sum_{k=1}^{K-2}\frac{|F_{k,s}|^2}{6}\right),$$

$$s = 0, 1, 2,$$

where $K = \left\lfloor \frac{N_{used}}{3} \right\rfloor$, k is a preamble symbol index, $N_{used}$ is the number of subcarriers that may be used in the frequency domain, s is a sector index, and $F_{k,s}$ is defined by the equation below:

$$F_{0,s} = X^*_{0,s}Y_{0,s} - X_{1,s}Y_{1,s}$$

$$F_{k,s} = 2X^*_{k,s}Y_{k,s} - X^*_{k-1,s}Y_{k-1,s} - X^*_{k+1,s}Y_{k+1,s}, k=1, 2, \ldots, K-2$$

$$F_{K-1,s} = X^*_{K-1,s}Y_{K-1,s} - X^*_{K-2,s}Y_{K-2,s}$$

where $X_{k,s}$ is a signal transmitted by each sector, and $Y_{k,s}$ is the reception signal received by each sector.

2. An apparatus for estimating a signal to noise ratio (SNR), the apparatus comprising:
   a signal power estimator configured for estimating power of a reception signal for each sector;
   noise power estimators each configured for estimating noise power for each sector;
   a minimum value selector configured for selecting a minimum value from among the noise powers for a plurality of sectors;
   an adder configured for outputting a net power for each sector which is obtained by subtracting the minimum value from the power of the reception signal for each sector; and
   a divider configured for calculating the SNR by dividing the net power for each sector by the minimum value,
   wherein the SNR is calculated using the equation below:

$$S\hat{N}R_s = \frac{\hat{P}_s}{\hat{\sigma}_s^2} = \frac{\frac{1}{K}\sum_{k=0}^{K-1}|Y_{k,s}^{(n)}|^2 - \hat{\sigma}_s^2}{\hat{\sigma}_s^2},$$

where $\hat{P}_s$ is the net power for each sector, $\hat{\sigma}_s^2$ is the minimum value of the noise power for each sector, $$K = \left\lfloor \frac{N_{used}}{3} \right\rfloor,$$

k is a preamble symbol index, $N_{used}$ is the number of subcarriers that may be used in the frequency domain, s is a sector index, n is an orthogonal frequency division multiplexing (OFDM) symbol index, and $Y_{k,s}$ is the reception signal received by each sector.

* * * * *